UNITED STATES PATENT OFFICE.

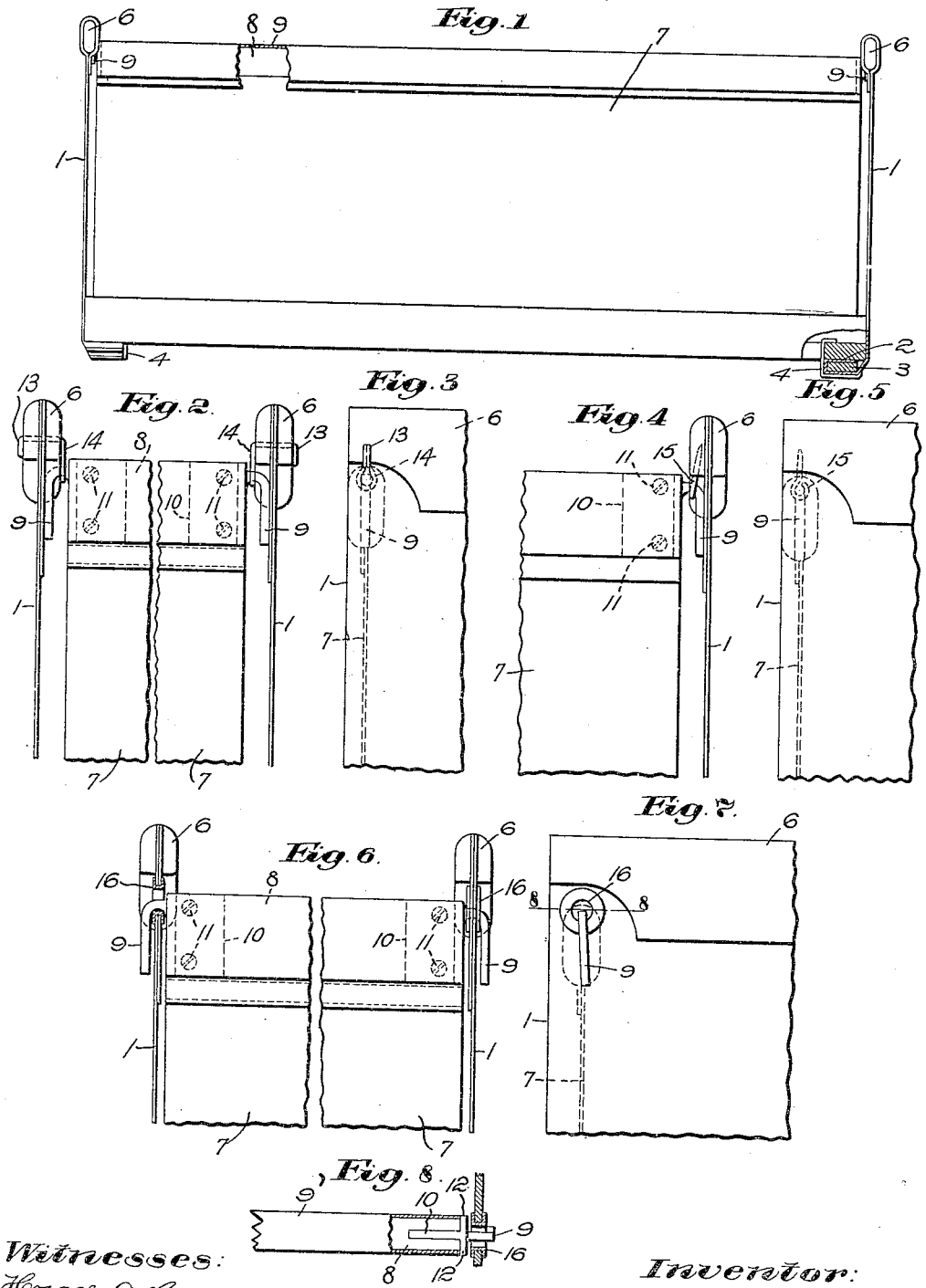

ISAAC E. PALMER, OF MIDDLETOWN, CONNECTICUT, ASSIGNOR TO THE I. E. PALMER CO., OF MIDDLETOWN, CONNECTICUT, A CORPORATION OF CONNECTICUT.

WIND-SHIELD OR BACK-REST FOR COUCH-HAMMOCKS.

1,094,924. Specification of Letters Patent. Patented Apr. 28, 1914.

Original application filed September 20, 1912, Serial No. 721,337. Divided and this application filed November 4, 1912. Serial No. 729,297.

*To all whom it may concern:*

Be it known that I, ISAAC E. PALMER, a citizen of the United States, and a resident of Middletown, in the county of Middlesex and State of Connecticut, have invented an Improvement in Wind-Shields or Back-Rests for Couch-Hammocks, of which the following description, in connection with the accompanying drawings, is a specification, like characters on the drawings representing like parts.

This invention relates to wind shields or back rests for couch hammocks, and is a division of my co-pending application Serial No. 721,337, filed September 20, 1912.

An important object of the invention is to provide a wind shield or back rest which can be readily and flexibly but securely connected to the suspension means of couch hammocks, and may readily be detached therefrom.

Referring more particularly to the drawings,—Figure 1 is a side elevation of a couch hammock having my invention applied thereto; Fig. 2 is a view mainly in side elevation showing a wind shield attached to the suspension ends of couch hammocks in accordance with my invention; Fig. 3 is a view taken at right angles to Fig. 2; and showing one of the suspension ends of the couch hammock in elevation; Fig. 4 is a view similar to Fig. 2, but showing a modified manner of attaching the wind shield to the suspension end; Fig. 5 is a view similar to Fig. 3 of the modified form of the invention shown in Fig. 4; Fig. 6 is a view similar to Fig. 2 of still another form of the invention; Fig. 7 is an end elevation thereof; and Fig. 8 is a detail upon the line 8—8 of Fig. 7 showing the hook upon the spreader end.

Couch hammocks have heretofore been provided with wind shields. These wind shields have frequently been laced to the suspension ends by means of gromet eyes and lacing cords, and combined back rests and wind shield have been provided with a spreader connected to wire brackets adapted to take over the spreaders of the suspension ends, as shown for example in my Patent No. 921,623, dated May 11, 1909.

The wind shield or back rest embodying my invention is flexibly connected to the suspension ends. Although I have shown my invention as applied to a wind shield, it is obvious that it may be employed in connection with a back rest. In either case, the device is adapted to be readily and yet securely but flexibly or loosely attached to the suspension means of the couch hammock in such a manner as to permit the ready detachment of the back rest or wind shield therefrom. In accordance with my invention hooks are provided upon the spreader which is detachably or permanently applied to the wind shield or back rest, and the said hooks are adapted to engage suitable means applied to the suspension ends, certain forms of which I have herein disclosed.

Referring more particularly to the drawings, the frame of the hammock is represented as composed of end members and longitudinal or side members detachably or otherwise secured into substantially rectangular position. The frame may, of course, be wooden or metallic or partially wood and partially metal as desired.

One of the suspension ends is indicated at 1 in Figs. 1, 2 and 4. Such suspension end is preferably of some suitable flexible material like canvas, although within the scope of the invention any suitable suspension means having eyes to receive the spreader hooks may be employed.

Within the scope of my invention, the hammock body may be continuous from end to end, as in the well-known Gloucester type of hammock, but preferably I employ separate suspension ends, so that the hammock seating is exposed beneath. In the event that separate suspension ends be employed, they may be attached to the hammock frame in any suitable manner. I have herein, however, represented one of the suspension ends as provided at its lower end with a pocket 2 having therein a spreader 3, which has secured thereto a series of hooks 4 adapted to engage the adjacent end member 1 of the frame, as clearly shown in Fig. 1. This permits the ready detachment of each of the suspension ends for washing or other purposes. The spreader 3 may, if desired, be removed from the suspension ends 1 to permit the washing of said ends. Each of the suspension ends is provided at its upper end with a usual spreader 6 from which the stringing cords may extend in the usual or any desired manner.

The wind shield is composed of any suitable sheet-like material, and if a back rest be employed, it may be of any suitable construction. Referring merely to that use of my invention involving the employment of a wind shield, the wind shield may be of such height as to extend beneath the adjacent longitudinal member of the frame and terminate at or adjacent the inner edge thereof. If desired, the lower portion of such wind shield may be attached at its lower edge in any suitable manner preferably permitting ready detachment thereof. If desired, I may employ a cord or lacing to secure the lower edge of the wind shield to the seating of the hammock. This permits the ready detachment of the wind shield from the hammock frame, and inasmuch as the wind shield is detachably connected to the suspension ends, it follows that all the fabric portions of the hammock may, in the preferred form of the invention, be readily detached from the frame for cleaning them or for other purposes.

Preferably I provide the wind shield with a spreader 8 detachably inserted in a suitable pocket 9', as indicated most clearly in Fig. 1. This spreader is intended mainly to prevent the wind shield from unduly bulging, but in the event of the employment of my invention in or in connection with a back rest, the spreader forms a portion of the back rest. At each end of the spreader 8 I provide a downwardly turned hook 9 having a web 10 which may be inserted in a vertical slot or socket in the end edge of the spreader, being secured therein, if desired, by screws 11. Each hook 9 may have lateral flanges 12 fitting flatwise against the edge of the spreader. The hook 9, it will be observed, lies in a plane substantially between the planes of the opposing faces of the spreader 8. If desired, the hook 9 may be slightly inclined forwardly, as indicated in Fig. 8, so as to cause it to hold more securely when inserted in the eye of the suspension end, or the hook may be inclined backwardly if desired. The hooks may be otherwise connected to the spreader within the scope of my invention.

Each hook 9 is adapted to engage yieldingly with some suitable portion of the suspension means. In Figs. 2 and 3, I have represented the suspension end as having a wire loop 13 inserted through the end of the spreader 6, which may be cut away, as in dotted lines in Fig. 3, wherein the spreader 8 is indicated in dotted outline. In Figs. 2 and 3, the wire loop 13 is represented as having an eye 14 intermediate its ends, the wire being bent upon itself, so that the terminals of the wire extend through the spreader and thence along the face thereof opposite the eye, as indicated in said figures.

Instead of employing a wire loop, as in Fig. 3, I may employ a screw eye 15 as indicated in Figs. 4 and 5, the hook 9 engaging the same flexibly or loosely as indicated. Any other suitable means may be provided to receive the hook 9. For example, the suspension end 1 may be provided at suitable points preferably along its vertical edge or edges, with gromet eyes 16, such as represented in Figs. 6 and 7, into which the hooks take. Any other suitable means may be provided whereby the spreader 8 may be hooked to the suspension means or ends, so as to provide a flexible or loose, readily detachable but secure connection.

It will be observed that by reason of the employment of hooks upon the spreader ends, I am enabled to dispense with the use of separate pieces, which may readily become lost. In other words, the hooks form a permanent part of the spreader, and there is no necessity for the use of additional piece to complete the union of the wind shield or back rest and the suspension ends of the hammock.

It will be observed that the hooks 9 flexibly engage the eyes of the suspension ends or means, so as to permit all required freedom of play. In other words, the wind shield is not rigidly connected to the suspension ends, but flexibility of movement of the wind shield and the suspension ends is permitted.

Having thus described one illustrative embodiment of my invention, I desire it to be understood that although specific terms are employed, they are used in a generic and descriptive sense and not for purposes of limitation, the scope of the invention being set forth in the following claims.

Claims:

1. As an article of manufacture, a spreader bar for a couch hammock wind shield or the like provided at its ends with eye-engaging hooks forming longitudinal continuations of said spreader.

2. As an article of manufacture, a spreader bar for a couch hammock wind shield or the like provided with eye engaging hooks extending from its end edges in a plane between the side faces of said spreader.

3. As an article of manufacture, a wind shield or back rest for a couch hammock consisting of a spreader bar provided at its ends with eye-engaging hooks forming longitudinal continuations of said spreader and adapted flexibly to engage the couch hammock suspension means, and a flexible sheet depending from said spreader.

4. As an article of manufacture, a spreader bar for a couch hammock wind shield or the like provided at its ends with eye-engaging hooks forming longitudinal continuations of said spreader, said hooks being inclined with respect to the longitudinal axis of said spreader.

In testimony whereof, I have signed my name to this specification, in the presence of two subscribing witnesses.

ISAAC E. PALMER.

Witnesses:
 IRVING U. TOWNSEND,
 ROBERT H. KAMMLER.